United States Patent
Kim et al.

(10) Patent No.: US 12,177,565 B2
(45) Date of Patent: Dec. 24, 2024

(54) AUTOMATIC FOCUS DETECTION METHOD OF CAMERA AND ELECTRIC DEVICE SUPPORTING SAME

(71) Applicant: SAMSUNG ELECTRONICS CO., LTD., Suwon-si (KR)

(72) Inventors: Ildo Kim, Suwon-si (KR); Sungoh Kim, Suwon-si (KR); Jonghun Won, Suwon-si (KR); Kihuk Lee, Suwon-si (KR); Dasom Lee, Suwon-si (KR); Dongwhan Lee, Suwon-si (KR); Jaemyung Lee, Suwon-si (KR); Jaemin Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 17/957,541

(22) Filed: Sep. 30, 2022

(65) Prior Publication Data

US 2023/0023479 A1 Jan. 26, 2023

Related U.S. Application Data

(63) Continuation of application No. PCT/KR2021/002874, filed on Mar. 9, 2021.

(30) Foreign Application Priority Data

Mar. 30, 2020 (KR) .................. 10-2020-0038328

(51) Int. Cl.
*H04N 23/67* (2023.01)
*G06T 7/70* (2017.01)

(52) U.S. Cl.
CPC ............. *H04N 23/675* (2023.01); *G06T 7/70* (2017.01)

(58) Field of Classification Search
CPC .......... H04N 5/23212; H04N 5/23293; H04N 23/675; H04N 23/959; G06T 7/0051; G06T 7/70; G06K 9/4661; G06K 2009/4666

See application file for complete search history.

(56) References Cited

U.S. PATENT DOCUMENTS 6,268,885 B1 7/2001 Ohta
6,822,688 B2 11/2004 Ohta
(Continued)

FOREIGN PATENT DOCUMENTS

JP 2009-37263 A 2/2009
JP 2011-2814 A 1/2011
(Continued)

OTHER PUBLICATIONS

International Search Report dated Jun. 24, 2021 issued by the International Searching Authority in International Application No. PCT/KR2021/002874 (PCT/ISA/210).
(Continued)

*Primary Examiner* — Xi Wang
(74) *Attorney, Agent, or Firm* — Sughrue Mion, PLLC

(57) ABSTRACT

An electronic device includes a camera device configured to adjust a focus; a distance extraction device; and a processor configured to: obtain a first image using the camera device; set a first region of interest for focus detection in a portion of the first image; obtain first depth information using the distance extraction device, the first depth information including a depth distance corresponding to at least one pixel included in the first image; set a second region of interest in another portion of the first image based on at least two portions which differ in depth distance being included in the first region of interest based on the first depth informa-
(Continued)

tion; and capture an image based on a focus determined corresponding to the second region of interest.

14 Claims, 11 Drawing Sheets

(56) References Cited

U.S. PATENT DOCUMENTS

| | | |
|---|---|---|
| 8,570,430 B2 | 10/2013 | Canetti |
| 9,900,500 B2 | 2/2018 | Lee |
| 10,009,534 B2 | 6/2018 | Kim |
| 10,078,198 B2 | 9/2018 | Lee et al. |
| 2003/0030741 A1 | 2/2003 | Ohta |
| 2011/0169998 A1 | 7/2011 | Canetti |
| 2014/0354874 A1 | 12/2014 | Lee |
| 2016/0042526 A1 | 2/2016 | Lee et al. |
| 2016/0241776 A1* | 8/2016 | Kim .................... G06V 40/161 |

FOREIGN PATENT DOCUMENTS

| | | |
|---|---|---|
| JP | 2012-502310 A | 1/2012 |
| JP | 2016-40578 A | 3/2016 |
| KR | 10-2014-0140855 A | 12/2014 |

OTHER PUBLICATIONS

International Written Opinion dated Jun. 24, 2021 issued by the International Searching Authority in International Application No. PCT/KR2021/002874 (PCT/ISA/237).

* cited by examiner

AUTOMATIC FOCUS DETECTION METHOD OF CAMERA AND ELECTRIC DEVICE SUPPORTING SAME

CROSS REFERENCE TO RELATED APPLICATIONS

This application is a bypass continuation application of International Application No. PCT/KR2021/002874, filed on Mar. 9, 2021, which is based on and claims the priority to Korean Patent Application No. 10-2020-0038328, filed on Mar. 30, 2020 in the Korean Intellectual Property Office, the disclosures of which are incorporated by reference herein in their entireties.

BACKGROUND

1. Field

Embodiments disclosed in the disclosure relate to an auto focus detection technology of a camera.

2. Description of Related Art

Various types of image capture devices (or imaging devices) such as digital single reflex lens (DSLR) cameras or mirrorless digital cameras have come to the market. Furthermore, an electronic device such as a smartphone or a tablet personal computer (PC) includes a camera module and provides a function of taking a picture or video.

In the image capture device or the electronic device, to focus accurately when taking a picture or video, the image capture device or the electronic device provides an auto focus function.

In a camera of an electronic device, when a focal distance includes different portions in a region of interest set when performing an auto focus detection operation, because the focal distance is detected at any position between a portion close in distance to the electronic device and a portion away in distance from the electronic device, the case where it is out of focus may occur.

SUMMARY

Provided is an electronic device for setting an alternative region of interest at a position different from a region of interest to focus, when a camera fails to focus in the region of interest, and setting focus based on the alternative region of interest.

According to an aspect of the disclosure, an electronic device includes: a camera device configured to adjust a focus: a distance extraction device; and a processor configured to: obtain a first image using the camera device; set a first region of interest for focus detection in a portion of the first image: obtain first depth information using the distance extraction device, the first depth information including a depth distance corresponding to at least one pixel included in the first image: set a second region of interest in another portion of the first image based on at least two portions which differ in depth distance being included in the first region of interest based on the first depth information; and capture an image based on a focus determined corresponding to the second region of interest.

The first region of interest may include a first portion and a second portion, a first portion depth distance of the first portion being different from a second portion depth distance of the second portion, and the processor may be further configured to: obtain a first focal distance based on the first region of interest: based on the first portion depth distance of the first portion being less than the second portion depth distance of the second portion, compare the first focal distance with the first portion depth distance of the first portion; and search for the second region of interest based on the first focal distance and the first portion depth distance being different from each other.

The processor may be further configured to, based on a difference between the first focal distance and the first portion depth distance being greater than a specified error value, search for the second region of interest.

The processor may be further configured to set a region having a maximum area among at least one candidate region as the second region of interest.

The processor may be further configured to capture an image based on the first focal distance based on at least one candidate region not being included in the first image.

The processor may be further configured to search for the second region of interest based on the first portion and the second portion being included at different depth intervals.

The processor may be further configured to detect at least one candidate region, included in the same depth interval as the first portion, in the first image.

The processor may be further configured to set a region having a maximum area among at least one candidate region as a candidate region.

The processor may be further configured to, based on an area of the candidate region being greater than a reference area, set the candidate region as the second region of interest.

The processor may be further configured to capture the image based on the first focal distance based on an area of the candidate region being less than or equal to a reference area.

The first portion may include a first object and the second portion may include a second object, and the processor may be further configured to, based on the first object extending to an outside of the first region of interest in the first image and the extended portion of the first object being located outside the first region of interest and having a size that is greater than or equal to a specified size, specify the second region of interest in at least a portion of the extended portion.

The distance extraction device may include at least one of a time of flight (ToF) camera, an infrared camera, or a stereo camera.

According to an aspect of the disclosure, an electronic device include: a camera device configured to adjust a focus: a distance extraction device; and a processor configured to: obtain a first image using the camera device; set a first region of interest for focus detection in a portion of the first image: obtain first depth information including a depth distance corresponding to each pixel among the plurality of pixels included in the first image using the distance extraction device: based on an edge component in the first region of interest not being detected, set a first portion having a specified depth interval in the first region of interest: set a second region of interest, having a depth distance in the specified depth interval and meeting a specified size, in another portion of the first image; and capture an image based on focus determined corresponding to the second region of interest.

The processor may be further configured to, based on an edge level of the first region of interest being less than a first reference value, search for the second region of interest.

The processor may be further configured to, based on a brightness level of the first region of interest being less than a second reference value, search for the second region of interest.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar denotations may be used for the same or similar components.

DETAILED DESCRIPTION

Hereinafter, various embodiments of the present invention will be described with reference to the accompanying drawings. However, this is not intended to limit the present invention to specific embodiments, and it should be understood that various modifications, equivalents, and/or alternatives of the embodiments of the present invention are included.

Figure 1:
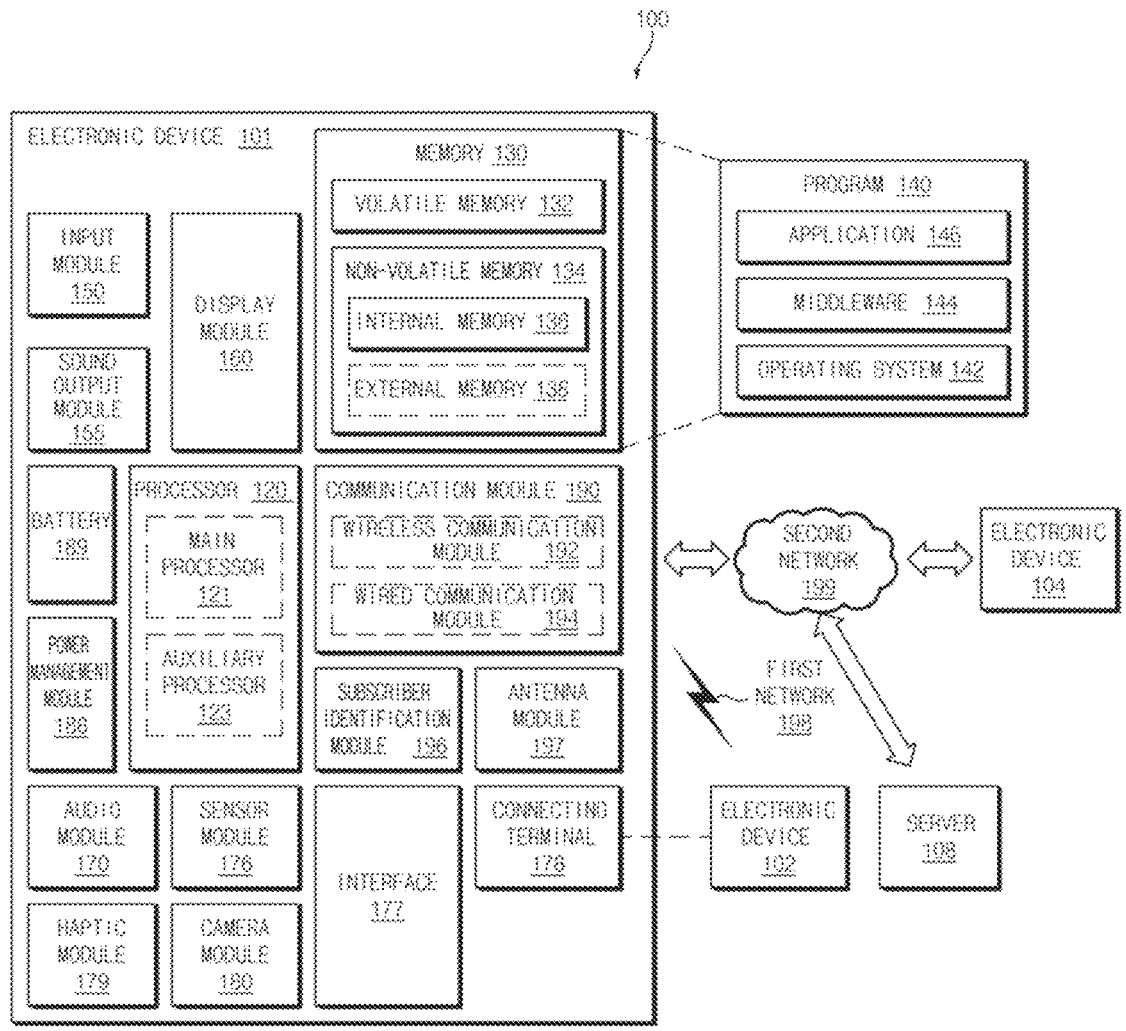
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
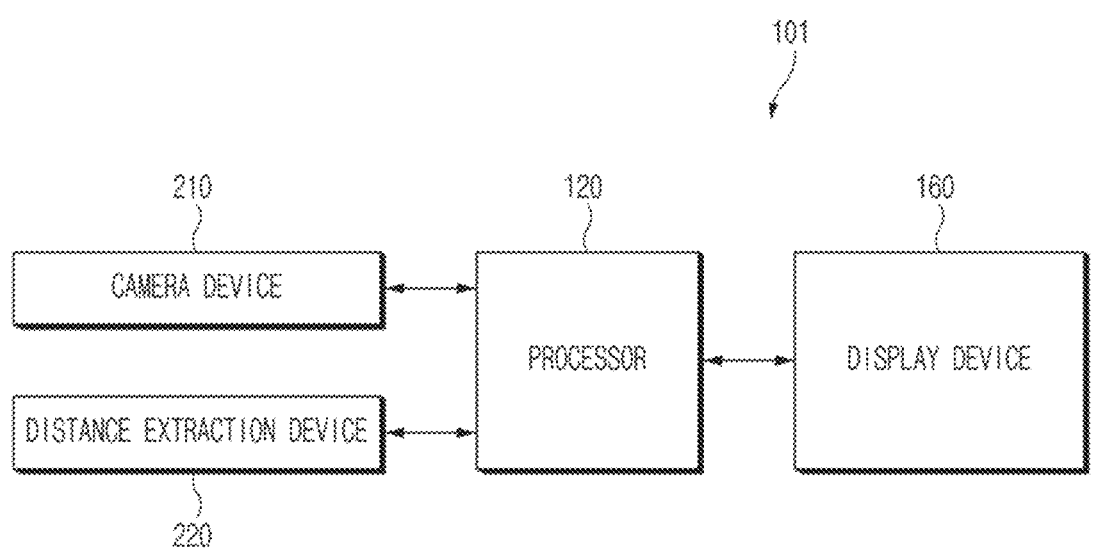
FIG. 2 is a block diagram illustrating an electronic device according to an embodiment.

FIG. 2 is a block diagram illustrating an electronic device according to an embodiment.

Referring to FIG. 2, an electronic device 101 may include a processor 120, a display device 160, a camera device 210, and/or a distance extraction device 220. For example, the processor 120 may control the overall operation of the electronic device 101. The processor 120 may be operatively connected with the display device 160, the camera device 210, and the distance extraction device 220. For example, the processor 120 may be a central processing unit, a microprocessor, or a controller and may be implemented as a system-on-a-chip or system on chip (SoC) together with another function unit such as a communication interface.

According to an embodiment, the processor 120 may obtain an image using the camera device 210 and may perform an auto focus detection operation using the image. For example, the processor 120 may set a region of interest (ROI) of a specified size in a portion of the image. The processor 120 may calculate (obtain) a focus detection result (e.g., a focal distance) based on the ROI. For example, the processor 120 may obtain a focal position using a contrast detection scheme (e.g., contrast auto focus (AF)) (refer to FIG. 3A described below) or a phase detection scheme (e.g., phase AF) (refer to FIG. 3B described below).

According to an embodiment, the processor 120 may obtain depth information corresponding to the image using the distance extraction device 220.

According to an embodiment, the processor 120 may determine whether portions which differ in depth distance are included in the ROI based on the depth information. For example, the ROI may include a first portion and a second portion, which have different depth distances. A depth distance of the first portion may be less than a depth distance of the second portion. The depth distance may be defined as, for example, a distance between the electronic device 101 (or the camera device 210 included in the electronic device 101) and an object included in the image. As an example, when the image includes a first object and a second object, the first portion may be at least a portion of the first object, and the second potion may be at least a portion of the second object. As another example, the first portion may be a portion of the first object, and the second portion may be another portion of the first object.

According to an embodiment, when portions which differ in depth distance are included in the ROI, the processor 120 may set an alternative ROI. For example, the processor 120 may compare the focal distance (e.g., a first distance) detected based on the ROI with a distance (e.g., a second distance) between the first portion included in the ROI according to the depth information and the electronic device 101. When the first distance and the second distance are different from each other, the processor 120 may determine whether a third portion having the same or similar depth distance to the first portion is present outside the ROI. For example, the similar depth distance may be a depth distance within a specified error value. In an embodiment, the third portion may be a portion of the first object or a portion of the second object, which is located outside the ROI. As another example, the third portion may be a portion of a third object. When the third portion is present outside the ROI, the processor 120 may determine whether a size of a candidate region including the third portion is greater than or equal to a specified size (e.g., the size of the ROI). When the candidate region is greater than or equal to the specified size, the processor 120 may set the candidate region to an alternative ROI and may perform an auto focus detection operation based on the alternative ROI. For example, the alternative ROI and the ROI may have substantially the same size.

According to an embodiment, the camera device 210 may collect light input through a lens to obtain an image (e.g., a red-green-blue (RGB) image). For example, the camera device 210 may include an image sensor. The image sensor may include a plurality of image pixels. The plurality of image pixels may collect light input through the lens to generate an image.

According to an embodiment, the camera device 210 may detect focus under control of the processor 120. For example, the camera device 210 may include at least one lens capable of adjusting focus. The camera device 210 may detect focus based on various schemes. For example, the camera device 210 may detect focus based on the contrast detection scheme (e.g., the contrast auto focus (AF)) (refer to FIG. 3A described below). For example, the camera device 210 may move the lens for each frame by a specified interval to obtain images and may measure sharpness of the images to detect a lens position having the highest sharpness as focus. For another example, the camera device 210 may detect focus based on the phase detection scheme (e.g., the phase AF) (refer to FIG. 3B described below). For example, the camera device 210 may include at least one phase detection pixel. The camera device 210 may determine a lens position in focus based on a disparity map stored by measuring a disparity between two sub-images obtained through the phase detection pixel by splitting an incident light. The focus detection method of the camera device 210 will be described with reference to FIGS. 3A and 3B.

According to an embodiment, the distance extraction device 220 may obtain depth information (e.g., a depth distance) corresponding to the image obtained by the camera device 210. For example, the distance extraction device 220 may obtain a depth information image corresponding to the image obtained by the camera device 210. For example, the depth information image may include depth information of an object (or a pixel corresponding to the object) included in the obtained image (e.g., a distance from the camera device 210 to an object). For example, the distance extraction device 220 may include a time of flight (ToF) camera, an infrared camera, or a stereo camera.

According to an embodiment, the display device 160 may visually provide information to the outside (e.g., a user) of the electronic device 101. For example, the display device 160 may include a display, a hologram device, or a projector, and a control circuit for controlling the corresponding device. The display device 160 may include touch circuitry configured to sense a touch or sensor circuitry (e.g., a pressure sensor) configured to measure the strength of a force generated by the touch. For example, the display device 160 may display an image (e.g., a preview image) obtained by the camera device 210. In an embodiment, the display device 160 may receive a user input (e.g., a touch by the user), and the processor 120 may set an ROI for an auto focus detection operation at a position corresponding to the user input.

Figure 3A:
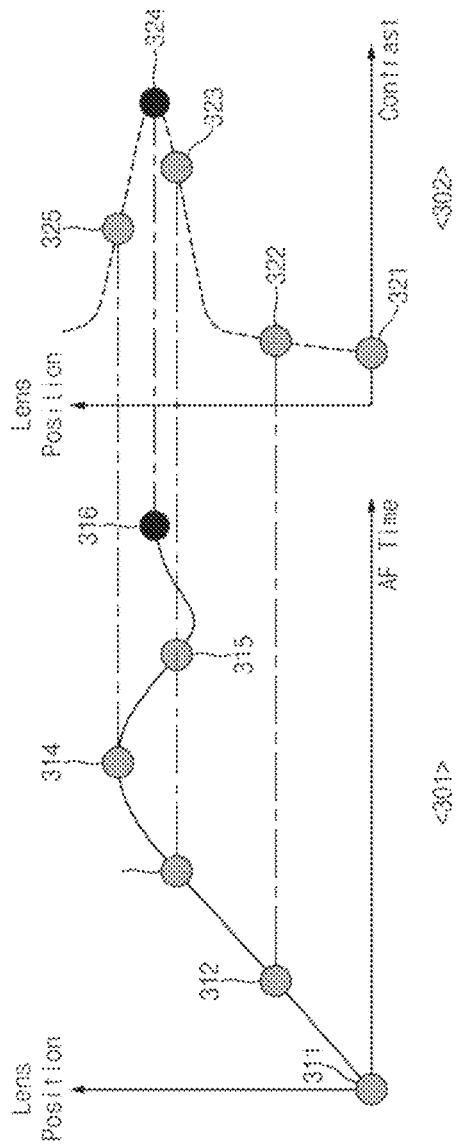
FIG. 3A is a drawing illustrating an example of a focus detection scheme according to an embodiment.
Figure 3B:
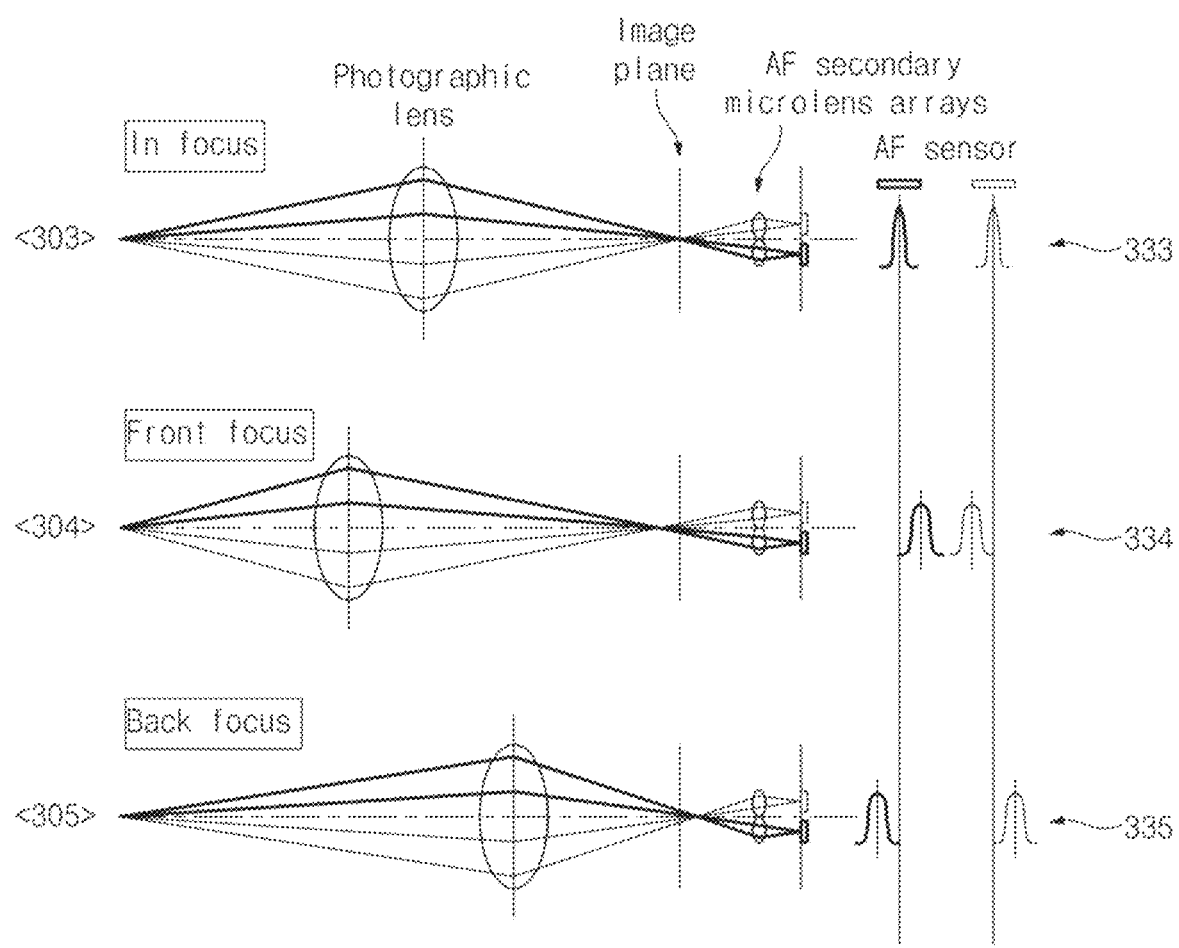
FIG. 3B is a drawing illustrating another example of a focus detection scheme according to various embodiments.
Figure 3C:
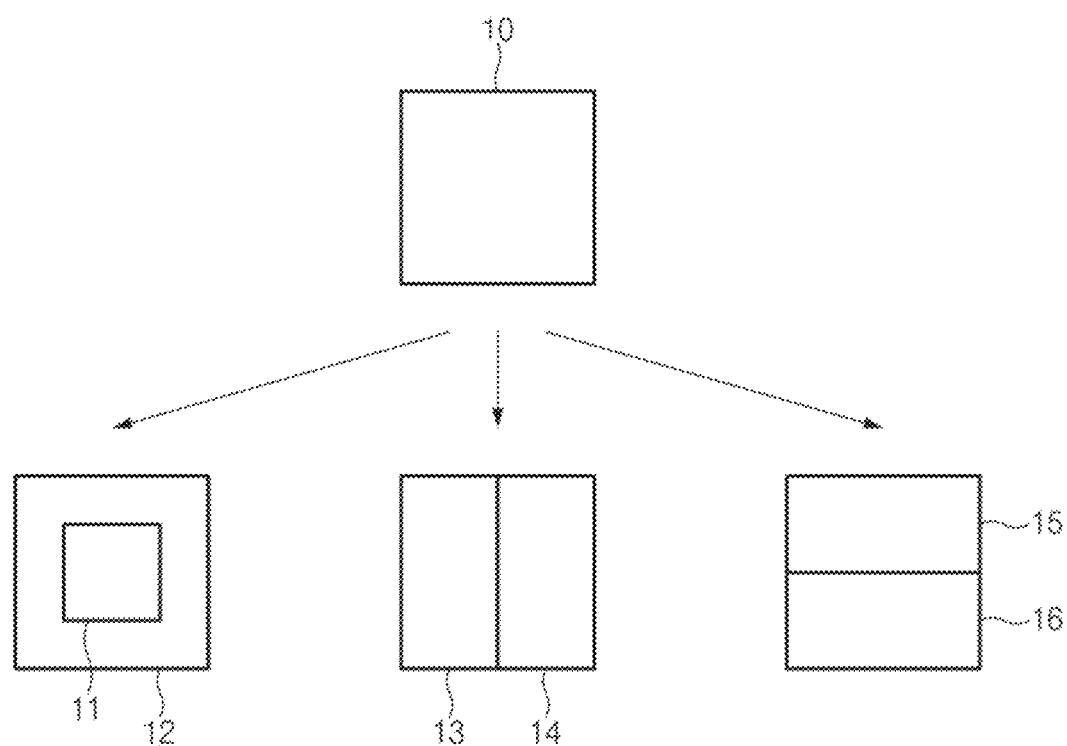
FIG. 3C is a drawing illustrating another example of a focus detection scheme according to various embodiments.

FIG. 3A is a drawing illustrating an example of a focus detection scheme according to an embodiment. FIG. 3B is a drawing illustrating another example of a focus detection scheme according to various embodiments. FIG. 3C is a drawing illustrating another example of a focus detection scheme according to various embodiments.

Referring to FIGS. 2 and 3A, an electronic device 101 may detect focus using a contrast detection scheme (e.g., contrast AF). For example, the contrast detection scheme is to move a lens to a position with the highest contrast using characteristics in which the contrast increases as the outline becomes clear in an image with accurate focus and the contrast decreases as the outline becomes blurred in an image with inaccurate focus. A processor 120 may measure the contrast of images obtained while adjusting a lens position of a camera device 210 and may determine focus at a lens position corresponding to an image with the highest contrast. For example, in a first graph 301, the processor 120 may change lens positions 311, 312, 313, 314, 315, and 316 of the camera device 210. In a second graph 302, the processor 120 may measure contrasts 321, 322, 323, 324, and 325 of an image, corresponding to the lens positions 311 to 316, while changing the lens positions 311 to 316. For example, the processor 120 may determine the focus of the camera device 210 at the lens position 316 corresponding to the highest contrast 324. The processor 120 may perform a contrast detection scheme for an ROI.

Referring to FIGS. 2 and 3B, the electronic device 101 may detect focus using a phase detection scheme (e.g., phase AF). For example, the phase detection scheme is to adjust focus using a phase difference between pixels in one image. The processor 120 may determine a lens position in focus based on a disparity map stored by measuring a disparity between two sub-images obtained by splitting light incident through a lens (e.g., a photographic lens) of the camera device 210. For example, in a state 303 in focus, divided sub-images may have the same phase in a phase sensor (e.g., an AF sensor or a phase detection pixel). In states 304 and 305 out of focus, divided sub-images may have different phases in the phase sensor (e.g., the AF sensor or the phase detection pixel). The processor 120 may perform a phase detection scheme for an ROI.

Referring to FIGS. 2 and 3C, the electronic device 101 may segment an ROI 10 to detect focus. For example, when there are portions (e.g., a first portion and a second portion) which differ in depth distance in the ROI 10, it may be difficult for the processor 120 to detect accurate focus using the method of FIG. 3A or 3B. At this time, the processor 120 may segment the ROI 10 into a plurality of sub-ROIs to detect focus. As an example, the ROI 10 may be divided into a first sub-ROI 11 and a second sub-ROI 12. As another example, the ROI 10 may be divided into a third sub-ROI 13 and a fourth sub-ROI 14. As another example, the ROI 10 may be divided into a fifth sub-ROI 15 and a sixth sub-ROI 16. However, the method for dividing the ROI 10 is illustrative, but not limited thereto. The processor 120 may calculate a focus detection result based on the method of FIG. 3A or 3B for each sub-ROI and may determine focus (or a lens position) depending on a specified criterion (e.g., by selecting focus corresponding to the closest object).

Figure 4:
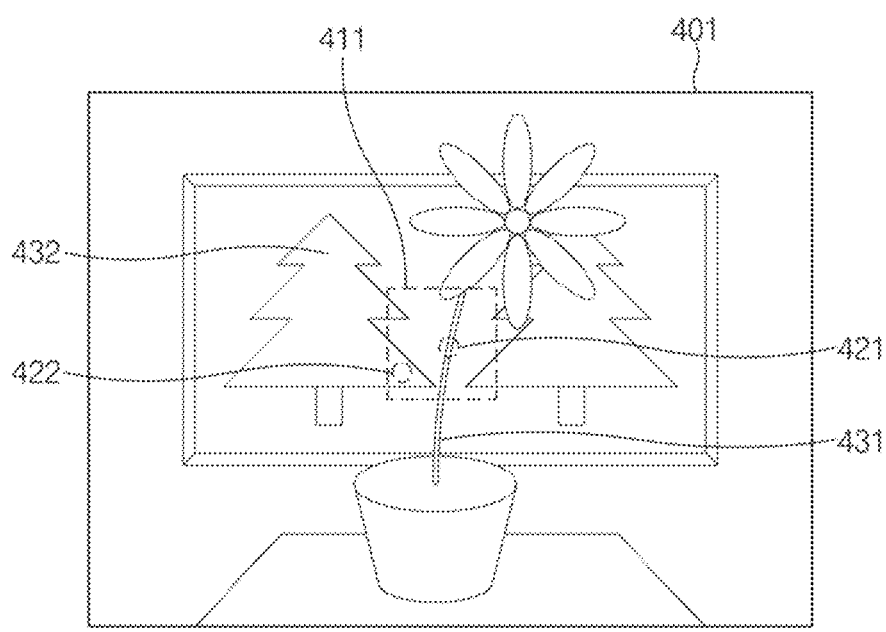
FIG. 4 is a drawing illustrating an example of an image obtained for auto focus detection according to an embodiment.
Figure 5:
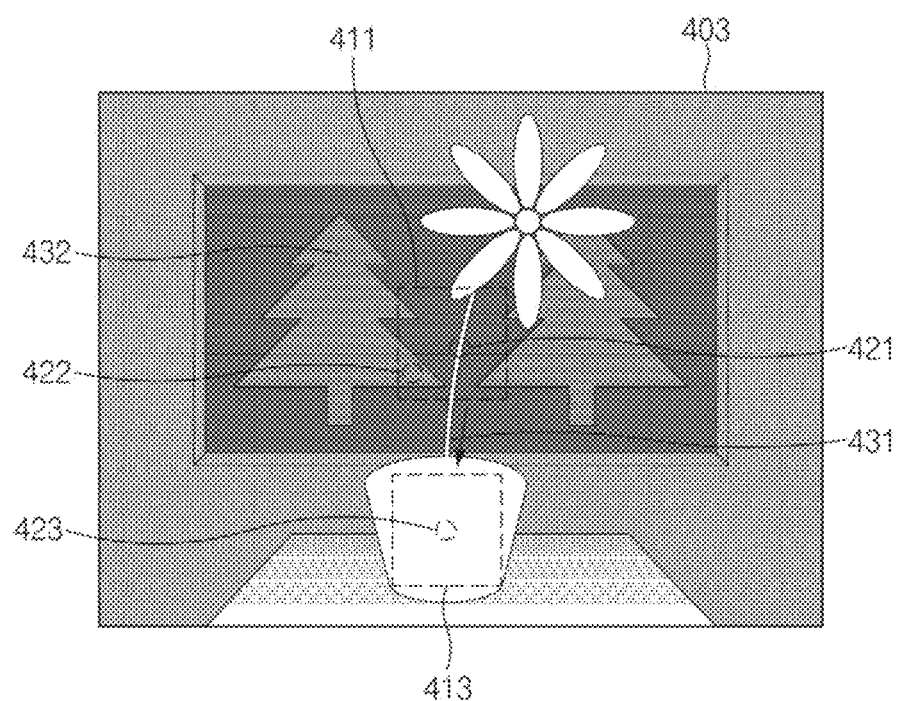
FIG. 5 is a drawing illustrating an example of a depth information image corresponding to an image of FIG. 4.

FIG. 4 is a drawing illustrating an example of an image obtained for auto focus detection according to an embodiment. FIG. 5 is a drawing illustrating an example of a depth information image corresponding to an image of FIG. 4.

Referring to FIGS. 2, 4, and 5, an electronic device 101 may obtain an image 401 for auto focus detection. For example, when an image capture-related application (e.g., a camera app) is run, a processor 120 may obtain the image 401 using a camera device 210. When a user input (e.g., an image capture button touch) associated with starting image capture is received, the processor 120 may set an ROI 411 in a portion of the image 401 for auto focus detection. For example, the ROI 411 may be set at a specified position (e.g., a central portion of the image 401) or a position corresponding to a user input (e.g., a touch of a user). For example, the ROI 411 may be set to a specified size. The processor 120 may obtain a depth information image 403 corresponding to the image 401 using a distance extraction device 220. For example, the depth information image 403 may include depth information including a depth distance from the electronic device 101 for objects (e.g., flowers, stems, flowerpots, desks, or trees) included in the image 401 (or each portion or each pixel of the image 401).

According to an embodiment, the processor 120 may perform auto focus detection depending on a method of FIG. 3A or 3B based on the ROI 411. For example, the processor 120 may obtain a first focal distance (e.g., a depth distance in which at least one object included in the ROI 411 is clearly shown) based on the ROI 411. At this time, when portions, for example, a first portion 421 (e.g., at least a portion of a first object 431) and a second portion 422 (e.g., at least a portion of a second object 432)) which differ in depth distance are included in the ROI 411, it may be difficult for the processor 120 to obtain an accurate focal distance. Thus, the processor 120 may determine whether there are portions which differ in depth distance in the ROI 411 or whether it is out of focus by the first portion 421 and the second portion 422, which differ in depth distance of the ROI 411. For example, the processor 120 may obtain a first portion depth distance for the first portion 421 (e.g., an object to focus on, a near object, a stem of a flower in FIG. 4, or a portion of the first object 431) in the ROI 411 (e.g., a depth distance from the electronic device 101 to the first portion 421) using the depth information image 403. The processor 120 may compare the first focal distance with the first portion depth distance. For example, when a difference between the first focal distance and the first portion depth distance is less than a specified difference value (e.g., when the difference between the first focal distance and the first portion depth distance is within a depth interval for the same field or a depth interval for a specified field), the processor 120 may determine that there are no portions which differ in depth distance in the ROI 411. When the difference between the first focal distance and the first portion depth distance is greater than or equal to the specified difference value, the processor 120 may determine that there are portions which differ in depth distance in the ROI 411.

According to an embodiment, when there are no portions which differ in depth distance in the ROI 411 (or when a difference in depth distance between the first portion 421 and the second portion 422 included in the ROI 411 is less than the specified difference value), the processor 120 may capture an image using the first focal distance.

According to an embodiment, when there are portions which differ in depth distance in the ROI 411 (or when the difference in depth distance between the first portion 421 and the second portion 422 included in the ROI 411 is greater than or equal to the specified difference value), the processor 120 may segment the ROI 411 into sub-ROIs depending on a method of FIG. 3C to detect focus. For example, the processor 120 may detect focus on sub-ROIs and may detect focus depending on a specified condition (e.g., select focus corresponding to a depth distance of the first portion 421 in the focus detected based on the sub-ROIs).

According to an embodiment, when there are portions which differ in depth distance in the ROI 411 (or when the difference in depth distance between the first portion 421 and the second portion 422 included in the ROI 411 is greater than or equal to the specified difference value), the processor 120 may set an alternative ROI 413. For example, the processor 120 may search a region outside the ROI 411 for a candidate region, which has a depth distance within a specified error value from the first portion 421 and has a specified size (e.g., a size capable of detecting focus using the method of FIG. 3A or 3B or the same or similar size to the ROI 411), based on the depth information image 403. As an example, the processor 120 may identify whether the first object 431 extends to the outside of the ROI 411. When the first object 431 extends to the outside of the ROI 411, the processor 120 may search the extended portion of the first object 431 for the candidate region. In an embodiment, when the candidate region is present and when the depth distance is within a specified error value from the first portion 421, the processor 120 may set the candidate region as the alternative ROI 413. The processor 120 may perform the method of FIG. 3A or 3B based on the alternative ROI 413 to obtain a second focal distance. Because the alternative ROI 413 has the same or similar depth distance to the first portion 421 and has an area of a specified size or more, the processor 120 may more accurately detect focus using the method of FIG. 3A or 3B based on the alternative ROI 413. The processor 120 may capture an image based on the second focal distance.

According to various embodiments, when there are portions in the ROI 411 which differ in depth distance, the processor 120 may determine whether it is possible to detect focus on the first portion 421 in the ROI 411. For example, the processor 120 may obtain a first focal distance based on the first portion 421 using the method of FIG. 3C. However, it may be difficult to detect focus on the first portion 421 using the method of FIG. 3C. For example, when the size of the first portion 421 in the ROI 411 is smaller than a specified size (e.g., when the first object 431 has an elongated shape like the stem of the flow in FIG. 4), it may be difficult for the processor 120 to detect focus on the first portion 421 when the method of FIG. 3C is used. When it is difficult to detect the focus on the first portion 421 using the method of FIG. 3C, the processor 120 may determine whether there is the alternative ROI 413. When the alternative ROI 413 is present, the processor 120 may perform the method of FIG. 3A, 3B, or 3C based on the alternative ROI 413 to obtain the second focal distance. Because the alternative ROI 413 has a depth distance within a specified error value from the first portion 421 and has an area of a specified size or more, the processor 120 may more accurately detect focus using the method of FIG. 3A, 3B, or 3C based on the alternative ROI 413. The processor 120 may capture an image based on the second focal distance.

According to various embodiments, when focus is not determined even after the method of FIG. 3C is performed a specified number of times, the method for detecting the focus using the alternative ROI 413 may be performed.

Figure 6:
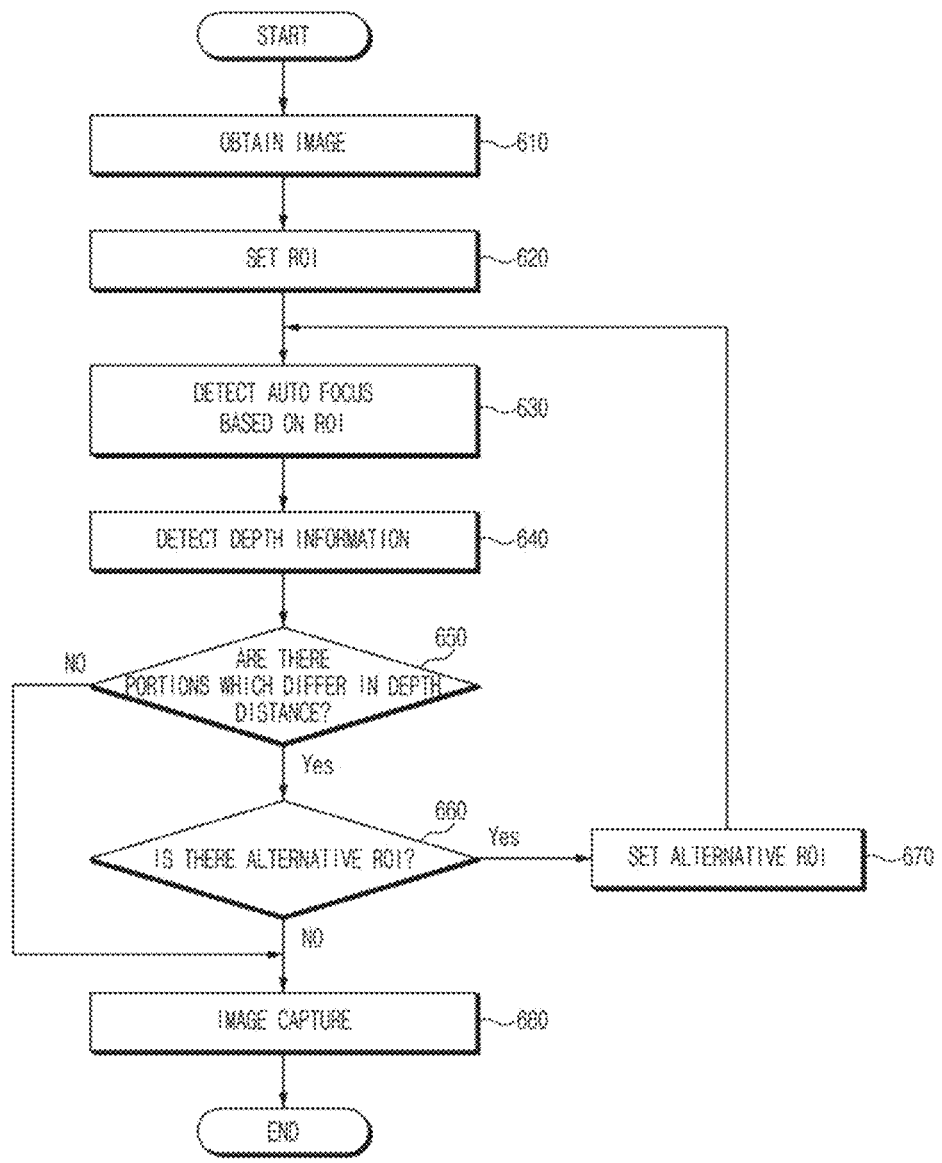
FIG. 6 is a flowchart illustrating an auto focus detection method according to an embodiment.

FIG. 6 is a flowchart illustrating an auto focus detection method according to an embodiment.

Referring to FIGS. 2 and 4 to 6, an electronic device 101 may perform an auto focus detection operation. For example, when an image capture-related application (e.g., a camera app) is run, a processor 120 may drive a camera device 210 and a distance extraction device 220.

According to an embodiment, in operation 610, the processor 120 may obtain an image 401 for auto focus detection using the camera device 210. In operation 620, the processor 120 may set an ROI 411 in a portion of the image 401. For example, the ROI 411 may be set at a specified position (e.g., a central portion of the image 401) or a position corresponding to a user input (e.g., a touch of a user). The ROI 411 may be set to, for example, a specified size.

According to an embodiment, in operation 630, the processor 120 may perform auto focus detection based on the ROI 411. For example, the processor 120 may perform auto focus detection depending on a method of FIG. 3A or 3B based on the ROI 411. The processor 120 may obtain a first focal distance (e.g., a depth distance in which at least one object included in the ROI 411 is clearly shown) based on the ROI 411. As an example, the processor 120 may determine a lens position corresponding to the ROI 411 using the auto focus detection and may calculate a depth distance corresponding to the lens position based on stored depth distance conversion data (e.g., matching data between the lens position and a depth distance to a subject when it is in focus). The processor 120 may store the calculated depth distance as the first focal distance. According to an embodiment, in operation 640, the processor 120 may detect depth information (or a depth distance) corresponding to the image 401. For example, the processor 120 may obtain a depth information image 403 corresponding to the image 401 using the distance extraction device 220. The depth information image 403 may include distance information from the electronic device 101 for objects (e.g., flowers, stems, flowerpots, desks, or trees) included in the image 401.

According to an embodiment, in operation 650, the processor 120 may determine whether there are portions which differ in depth distance in the ROI 411. For example, the processor 120 may obtain a first portion depth distance for a first portion 421 (e.g., a portion with a minimum depth distance in the ROI 411, at least a portion of an object to focus on, a near object, a stem of a flower in FIG. 4) in the ROI 411 (e.g., a depth distance from the electronic device 101 to the first portion 421) using the depth information image 403. The processor 120 may compare the first focal distance obtained in operation 630 with the first portion depth distance. For example, when a difference between the first focal distance and the first portion distance information is less than a specified error (or when a difference in depth distance between the first portion 421 and a second portion 422 included in the ROI 411 is less than the specified error) (e.g., the first portion 421 and the second portion 422 are included within the same depth interval or a specified depth interval), the processor 120 may determine that there are no portions which differ in depth distance in the ROI 411. For example, when the difference between the first focal distance and the first portion distance information is greater than the specified error value (or when the difference in depth distance between the first portion 421 and the second portion 422 included in the ROI 411 is greater than the specified error) (e.g., the first portion 421 and the second portion 422 are included in different depth intervals), the processor 120 may determine that there are portions which differ in depth distance in the ROI 411. When there are no portions which differ in depth distance in the ROI 411, the processor 120 may move to operation 680 to capture an image based on the first focal distance. When there are portions which differ in depth distance in the ROI 411, the processor 120 may perform operation 660.

According to various embodiments, in operation 650, the processor 120 may obtain the first focal distance based on a method of FIG. 3C. For example, when there are portions which differ in depth distance in the ROI 411, the processor 120 may divide the ROI 411 into sub-ROIs to obtain the first focal distance depending on a specified criterion. As an example, the processor 120 may perform the method of FIG. 3C a specified number of times. When the difference between the first focal distance and the first portion distance information is less than the specified error value within the specified number of times, the processor 120 may move to operation 680 to capture an image based on the first focal distance. After performing the method of FIG. 3C the specified number of times, when the difference between the first focal distance and the first portion distance information is greater than the specified error value, the processor 120 may perform operation 660.

According to an embodiment, in operation 660, the processor 120 may determine whether there is an alternative ROI. For example, when there are portions which differ in depth distance in the ROI 411, it may be difficult for the processor 120 to accurately detect focus even using a method of FIG. 3A or 3B. For example, the processor 120 may search a region outside the ROI 411 for at least one candidate region including a third portion 423, which has a depth distance of less than the specified error value from the first portion depth distance and has a specified size (e.g., a size capable of detecting focus using the method of FIG. 3A or 3B or the same or similar size to the ROI 411), based on the depth information image 403. As an example, the processor 120 may identify whether a first object 431 including at least a portion of the first portion 421 extends to the outside of the ROI 411. When the first object 431 extends to the outside of the ROI 411, the processor 120 may search the extended portion of the first object 431 for the candidate region. For example, the extended portion of the first object 431 may include the third portion 423. When there is no candidate region, the processor 120 may move to operation 680 to capture an image based on the first focal distance. When the candidate region is present, the processor 120 may perform operation 670.

According to an embodiment, in operation 670, the processor 120 may set an alternative ROI 413. As an example, the processor 120 may specify a region having the largest area among the at least one candidate region as the alternative ROI 413. The processor 120 may perform operations 630 to 660 again based on the alternative ROI 413. Because the third portion 423 included in the alternative ROI 413 has a depth distance within a specified error value from the first portion 421 and has an area of a specified size or more, the processor 120 may detect accurate focus using the method of FIG. 3A or 3B based on the alternative ROI 413. The processor 120 may perform operations 630 to 660 based on the alternative ROI 413 to obtain a second focal distance (e.g., focus on a depth distance of the first portion 421).

According to an embodiment, in operation 680, the processor 120 may capture an image based on the first focal distance or the second focal distance. For example, because there are no portions which differ in depth distance in the alternative ROI 413 when operation 650 is performed again based on the second focal distance, the processor 120 may capture an image based on the second focal distance. For example, the processor 120 may move a lens of the camera device 210 (or may adjust a lens position) based on the first focal distance or the second focal distance. When there is no shutter input of a user after the lens is focused to move, the processor 120 may repeatedly perform operations 610 to 670. When there is a shutter input of the user after the lens is focused to move, the processor 120 may capture an image depending on the determined focus.

Figure 7:
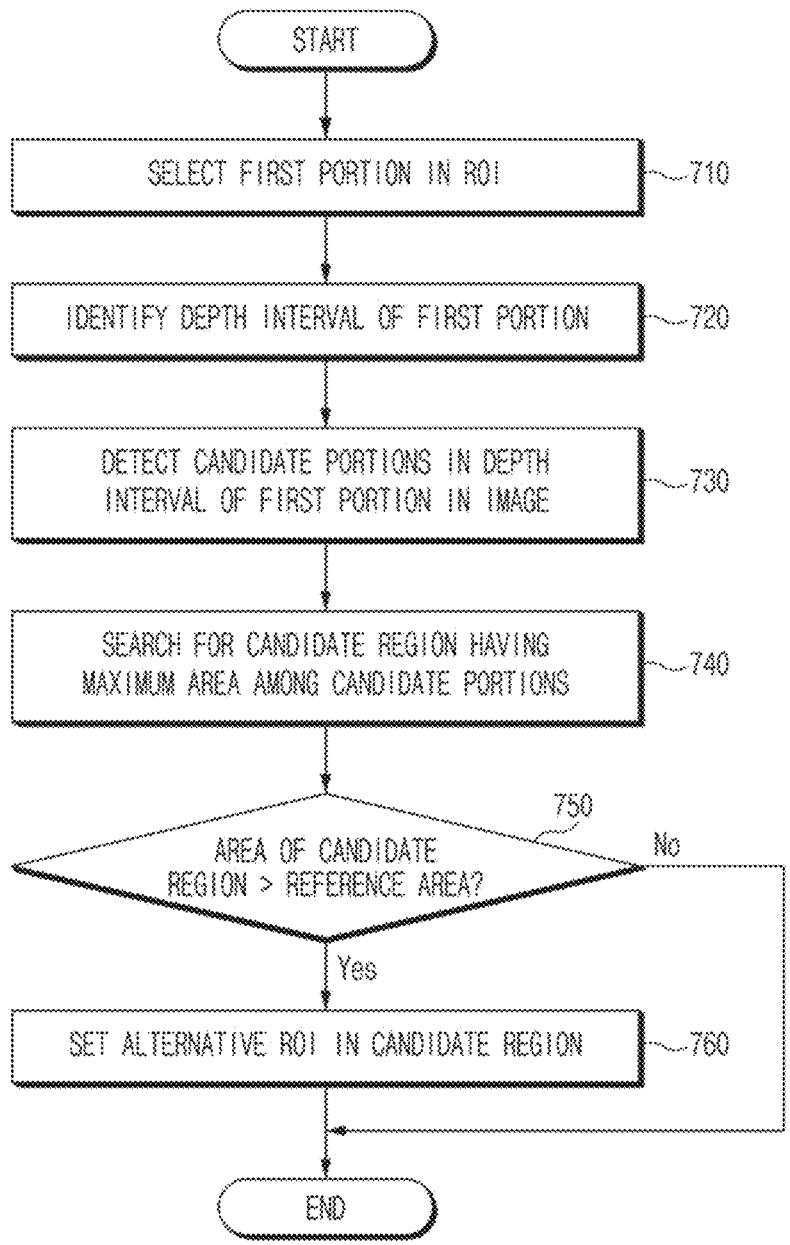
FIG. 7 is a flowchart illustrating a method for searching for an alternative region of interest of FIG. 6.

FIG. 7 is a flowchart illustrating a method for searching for an alternative region of interest of FIG. 6. The method for searching for the alternative ROI in FIG. 7 may indicate an example of operations 660 and 670 of FIG. 6.

Referring to FIGS. 2, 4, and 7, in operation 710, a processor 120 may select a first portion 421 in an ROI 411. For example, the first portion 421 may include a first object 431 with a minimum depth distance in the ROI 411. The first portion 421 may be identified using operation 650 of FIG. 6.

According to an embodiment, in operation 720, the processor 120 may identify a depth interval of the first portion 421. For example, the depth interval may indicate a range of depth distances of pixels included in the first portion 421. For example, the processor 120 may generate a depth table based on a depth information image 403 and may identify a depth interval (or a range of a depth distance) of the first portion 421 using the depth table.

According to an embodiment, in operation 730, the processor 120 may detect at least one candidate region included in the depth interval of the first portion 421 in an image 401. For example, the at least one candidate region may have a depth distance within a specified range. As an example, the at least one candidate region may be a portion of a first object 431 included in the first portion 421. As another example, the at least one candidate region may be a portion of an object different from the first object 431.

According to an embodiment, in operation 740, the processor 120 may search for a candidate region having a maximum area among the at least one candidate region. For example, the processor 120 may specify the largest portion among the at least one candidate region as the candidate region.

According to an embodiment, in operation 750, the processor 120 may compare an area of the candidate region with a reference area (e.g., a minimum area capable of detecting focus using a method of FIG. 3A or 3B or the same or similar size to the ROI 411). For example, when the area of the candidate region is less than or equal to the reference area, the processor 120 may fail to set an alternative ROI 413 and may perform operation 680 of FIG. 6 based on a first focal distance detected in operation 630 of FIG. 6. When the area of the candidate region is greater than the reference area, the processor 120 may perform operation 760.

According to an embodiment, when the area of the candidate region is greater than the reference area, in operation 760, the processor 120 may set the alternative ROI 413 in the candidate region. The processor 120 may set the alternative ROI 413 and may perform operations 630 to 660 of FIG. 6 again.

Figure 8:
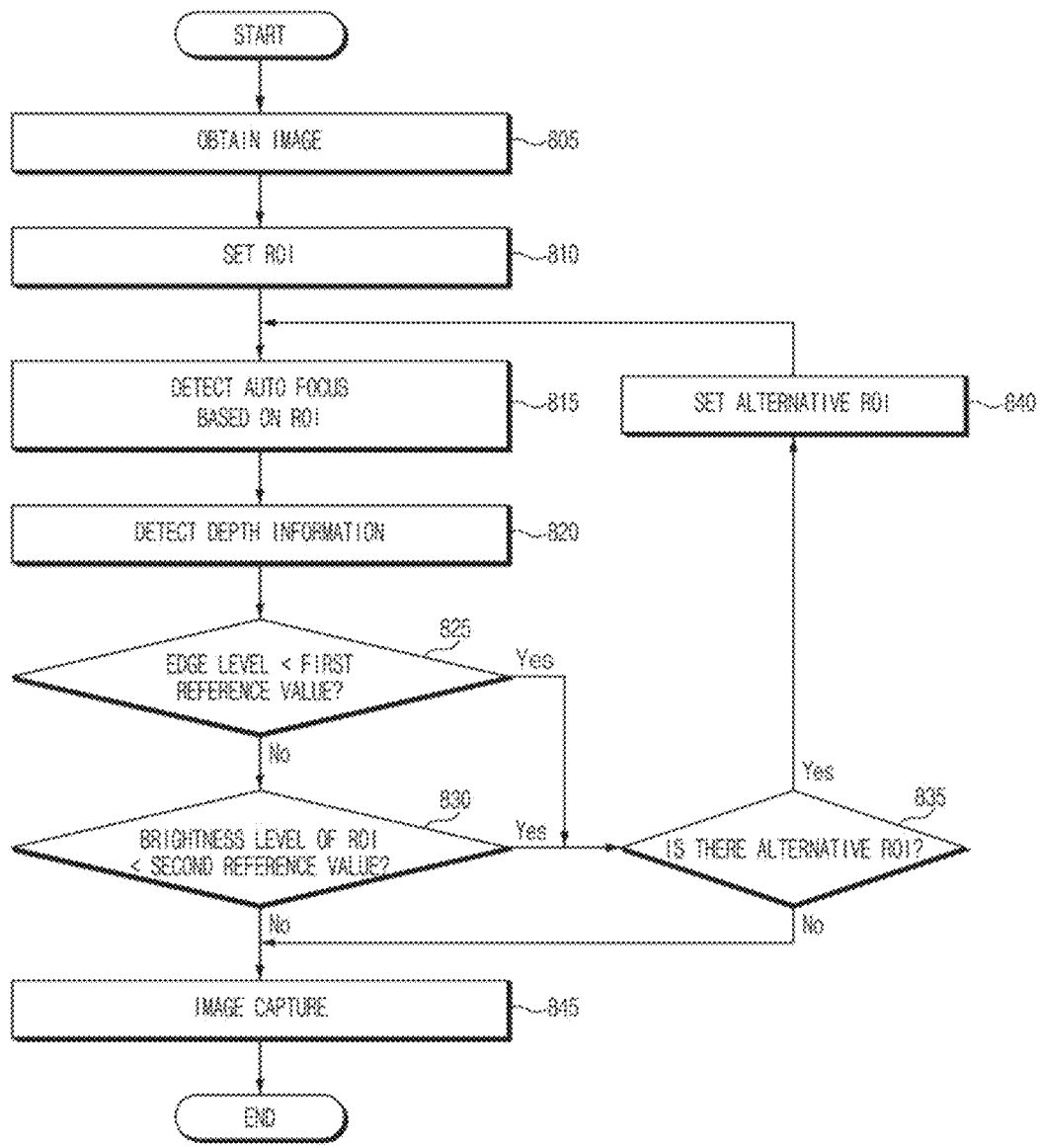
FIG. 8 is a flowchart illustrating an auto focus detection method according to various embodiments.

FIG. 8 is a flowchart illustrating an auto focus detection method according to various embodiments.

Referring to FIGS. 2, 4, 5, and 8, an electronic device 101 may perform an auto focus detection operation in a relatively dark place (e.g., a place of a specified brightness or less). For example, when an image capture-related application (e.g., a camera app) is run, a processor 120 may drive a camera device 210 and/or a distance extraction device 220.

According to an embodiment, in operation 805, the processor 120 may obtain an image 401 for auto focus detection using the camera device 210. In operation 810, the processor 120 may set an ROI 411 in a portion of the image 401. In operation 815, the processor 120 may perform auto focus detection based on the ROI 411. In operation 820, the processor 120 may detect depth information (or a depth distance) corresponding to the image 401. Operations 805 to 820 may include the same or similar configuration and feature as operations 610 to 640 of FIG. 6, and a description of the same or similar configuration and feature as operations 610 to 640 of FIG. 6 will be omitted.

According to an embodiment, when it is unable for the processor 120 to detect an edge component in the ROI 411, the processor 120 may search for an alternative ROI 413. For example, when illumination around the electronic device 101 is less than or equal to specified illumination value or when there is no edge component in at least one object included in the ROI 411, the processor 120 may fail to detect an edge component from the ROI 411. Thus, the processor 120 may determine whether it is possible to detect an edge component from the ROI 411 in operation 825 or 830. In FIG. 8, it is illustrated that operation 830 is performed after operation 825. However, this is illustrative, and, according to various embodiments, operation 830 may be performed at the same time as operation 825 or may be performed earlier than operation 825.

According to an embodiment, in operation 825, the processor 120 may compare an edge level with a first reference value. For example, the processor 120 may detect the edge level from the ROI 411. As an example, the edge level may include the sum of edge-related data obtained by performing image filtering of the ROI 411. For example, the edge level may refer to contrast in a contrast AF scheme. When the edge level is greater than or equal to the first reference value (e.g., when the degree to which objects in the ROI 411 are divided meets a specified criterion), the processor 120 may perform operation 830. In operation 830, the processor 120 may compare a brightness level of the ROI 411 with a second reference value. When the brightness level of the ROI 411 is greater than or equal to the second reference value (e.g., when the amount of light in the ROI 411 is sufficient enough to detect focus), in operation 845, the processor 120 may capture an image based on the first focal distance detected in operation 815.

According to an embodiment, when the edge level is less than the first reference value in operation 825 (e.g., when the degree to which the objects in the ROI 411 are divided does not meet the specified condition), the processor 120 may perform operation 835. Alternatively, when the brightness level of the ROI 411 is less than the second reference value in operation 830 (e.g., when the focus detected using the method of FIG. 3A or 3B is unclear), the processor 120 may perform operation 835.

According to an embodiment, in operation 835, the processor 120 may determine whether there is an alternative ROI. In operation 840, the processor 120 may set the alternative ROI. As operation 835 includes the same or similar configuration and feature as operation 660 of FIG. 6 and as operation 840 includes the same or similar configuration and feature as operation 670 of FIG. 6, a description of the same or similar configuration and feature as operations 660 and 670 of FIG. 6 will be omitted.

According to an embodiment, in operation 845, the processor 120 may capture an image based on the first focal distance or a second focal distance. For example, when the edge level is greater than or equal to the first reference value in operation 825 and when the brightness level of the ROI 411 is greater than or equal to the second reference value in operation 830, the processor 120 may capture an image based on the first focal distance. Alternatively, when the alternative ROI 413 is set in operation 840, the processor 120 may perform operations 815 to 830 to obtain the second focal distance (e.g., focus on a depth distance of the first portion 421) and may capture an image based on the second focal distance. Because operation 845 includes the same or similar configuration and feature as operation 680 of FIG. 6, a description of the same or similar configuration and feature as operation 680 of FIG. 6 will be omitted.

Figure 9:
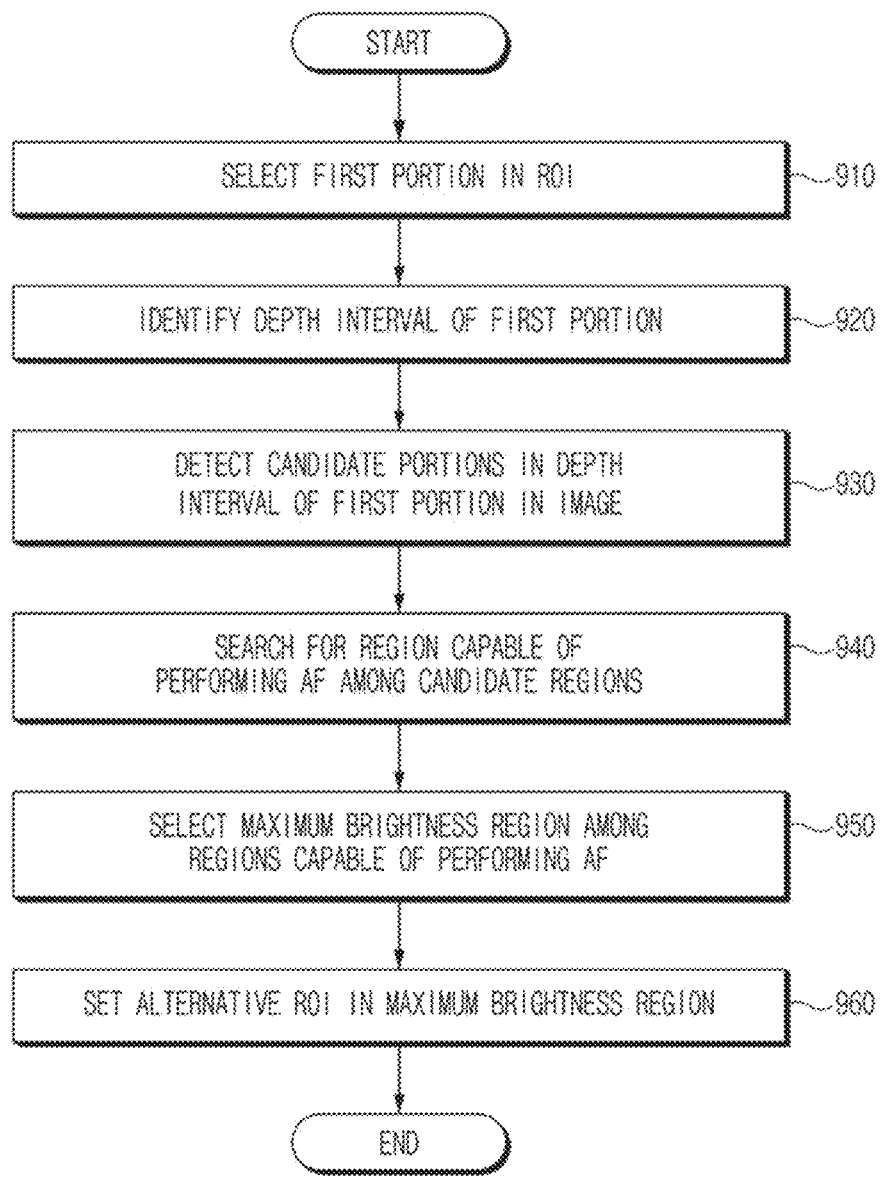
FIG. 9 is a flowchart illustrating a method for searching for an alternative region of interest of FIG. 8.

FIG. 9 is a flowchart illustrating a method for searching for an alternative region of interest of FIG. 8. The method for searching for the alternative ROI in FIG. 9 may indicate an example of operations 835 and 840 of FIG. 8.

Referring to FIGS. 2, 4, 5, 8, and 9, in operation 910, a processor 120 may select a first portion 421 in an ROI 411. For example, the processor 120 may select a portion with a minimum depth distance in the ROI 411 as a first portion 421. Alternatively, the processor 120 may select a portion included in a specified depth interval in the ROI 411 as the first portion 421.

According to an embodiment, in operation 920, the processor 120 may identify a depth interval of the first portion 421. In operation 930, the processor 120 may detect at least one candidate region included in the depth interval of the first portion 421 in an image 401. For example, operation 920 may include the same or similar configuration and feature as operation 720 of FIG. 7, and operation 930 may include the same or similar configuration and feature as operation 730 of FIG. 7. Thus, a description of the same or similar configuration and feature as operations 720 and 730 of FIG. 7 will be omitted.

According to an embodiment, in operation 940, the processor 120 may search for a region capable of performing auto focus detection among the candidate regions. For example, the processor 120 may determine at least one portion which is large in size (or area) than a reference size (or area) among the candidate regions as the region (e.g., a candidate region) capable of performing the auto focus detection. As an example, the processor 120 may determine the region capable of performing the auto focus detection in operations 740 and 750 of FIG. 7.

According to an embodiment, in operation 950, the processor 120 may select a maximum brightness region among the at least one determined region capable of performing the auto focus detection. In operation 960, the processor 120 may set an alternative ROI 413 in the maximum brightness region. The processor 120 may set the alternative ROI 413 and may perform operations 630 to 660 of FIG. 6 again.

According to various embodiments, an electronic device (e.g., an electronic device 101) may include a camera device (e.g., a camera device 210) for adjusting focus, a distance extraction device (e.g., a distance extraction device 220), and a processor (e.g., a processor 120) operatively connected with the camera device and the distance extraction device. The processor may be configured to obtain a first image (e.g., an image 401) using the camera device, set a first region of interest (e.g., a region of interest 411) for focus detection in a portion of the first image, obtain first depth information (e.g., a depth information image 403) including a depth distance corresponding to at least one pixel included in the first image using the distance extraction device, set a second region of interest (e.g., an alternative region of interest 413) in another portion of the first image, when there are two portions (e.g., a first portion 421 and a second portion 422) which differ in depth distance in the first region of interest based on the first depth information, and perform image capture depending on focus determined based on the second region of interest.

According to various embodiments, the first region of interest may include a first portion (e.g., a first portion 421) and a second portion (e.g., a second portion 422), which differ in depth distance. The processor is configured to obtain a first focal distance based on the first region of interest, compare the first focal distance with a first portion depth distance of the first portion, when the first portion depth distance of the first portion is less than a second portion depth distance of the second portion, and search for the second region of interest, when the first focal distance and the first portion depth distance are different from each other.

According to various embodiments, the processor may be configured to search for the second region of interest, when a difference between the first focal distance and the first portion depth distance is greater than a specified error.

According to various embodiments, the processor may be configured to search for the second region of interest, when a difference between the first focal distance and the first portion depth distance is greater than a specified error.

According to various embodiments, the processor may be configured to specify one having the largest area among at least one candidate region as the second region of interest.

According to various embodiments, the processor is configured to perform image capture depending on the first focal distance, when there is no at least one candidate region.

According to various embodiments, the processor may be configured to search for the second region of interest, when the first portion and the second portion are included in different depth intervals.

According to various embodiments, the processor may be configured to detect at least one candidate portion, included in the same depth interval as the first portion, in the first image.

According to various embodiments, the processor may be configured to specify one having a maximum area among at least one candidate portion as a candidate region.

According to various embodiments, the processor may be configured to specify the candidate region as the second region of interest, when an area of the candidate region is greater than a reference area.

According to various embodiments, the processor is configured to perform image capture depending on the first focal distance, when an area of the candidate region is less than or equal to a reference area.

According to an embodiment, the first portion may include a first object (e.g., a first object 431), and the second portion may include a second object (e.g., a second object 432). The processor may be configured to, when the first object extends to the outside of the first region of interest in the first image and when the extended portion of the first object, which is located outside the first region of interest, includes a specified size or more, specify the second region of interest in at least a portion of the extended portion.

According to various embodiments, the first region of interest may include a first portion and a second portion, which differ in depth distance. The processor is configured to, when the first portion depth distance of the first portion is less than the second portion depth distance of the second portion, segment the first region of interest into a plurality of sub-regions of interest, obtain the first focal distance based on a sub-region of interest including the first portion among the plurality of sub-regions of interest, repeatedly obtain the first focal distance during a plurality of times while changing shapes of the plurality of sub-regions of interest, and search for the second region of interest, when the first focal distance and the first portion depth distance are different from each other during the plurality of times.

According to various embodiments, the distance extraction device may include at least one of a ToF camera, an infrared camera, or a stereo camera.

According to various embodiments, an electronic device (e.g., an electronic device 101) may include a camera device (e.g., a camera device 210) for adjusting focus, a distance extraction device (e.g., a distance extraction device 220), and a processor (e.g., a processor 120) operatively connected with the camera device and the distance extraction device. The processor may be configured to obtain a first image (e.g., an image 401) using the camera device, set a first region of interest (e.g., a region of interest 411) for focus detection in a portion of the first image, obtain first depth information (e.g., a depth information image 403) including a depth distance corresponding to each pixel of the first image using the distance extraction device, select a first portion (e.g., a first portion 421) having a specified depth interval in the first region of interest, when not detecting an edge component in the first region of interest, set a second region of interest (e.g., an alternative region of interest 413), having a depth distance in the specified depth interval and meeting a specified size, in another portion of the first image, and perform image capture depending on focus determined based on the second region of interest.

According to various embodiments, the processor may be configured to search for the second region of interest, when an edge level of the first region of interest is less than a first reference value.

According to various embodiments, the processor may be configured to search for the second region of interest, when a brightness level of the first region of interest is less than a second reference value.

According to various embodiments, the processor may be configured to detect at least one candidate portion, included in the same depth interval as the first portion, in the first image and specify at least one, which is greater in size than the specified size, among the at least one candidate portion as a candidate region.

According to various embodiments, the processor may be configured to specify the second region of interest in a portion of a region having a maximum brightness in the candidate region.

According to various embodiments, the processor may be configured to select a portion, having the smallest depth distance in the first region of interest, as the first portion.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While embodiments of the disclosure have been described with reference to the figures, it will be understood by those of ordinary skill in the art that various changes in form and details may be made therein without departing from the spirit and scope included in the following claims and their equivalents.

What is claimed is:

1. An electronic device comprising:
    a camera device configured to adjust a focus;
    a distance extraction device; and
    a processor configured to:
        obtain a first image using the camera device;
        set a first region of interest for focus detection in a portion of the first image;
        obtain first depth information using the distance extraction device, the first depth information including a depth distance corresponding to at least one pixel included in the first image;
        obtain a first focal distance based on the first region of interest;
        obtain a first portion depth distance of a first portion included in the first region of interest, using the first depth information;
        obtain a second portion depth distance of a second portion included in the first region of interest, using the first depth information;
        based on the first portion depth distance being less than the second portion depth distance, compare the first focal distance with the first portion depth distance;
        set a second region of interest in another portion of the first image based on the first focal distance and the first portion depth distance being different from each other; and
        capture an image based on a focus determined corresponding to the second region of interest.

2. The electronic device of claim 1, wherein the processor is further configured to, based on a difference between the first focal distance and the first portion depth distance being greater than a specified error value, search for the second region of interest.

3. The electronic device of claim 2, wherein the processor is further configured to set a region having a maximum area among at least one candidate region as the second region of interest.

4. The electronic device of claim 2, wherein the processor is further configured to capture an image based on the first focal distance based on at least one candidate region not being included in the first image.

5. The electronic device of claim 1, wherein the processor is further configured to:
    search for the second region of interest based on the first portion and the second portion being included at different depth intervals.

6. The electronic device of claim 5, wherein the processor is further configured to detect at least one candidate region, included in the same depth interval as the first portion, in the first image.

7. The electronic device of claim 6, wherein the processor is further configured to set a region having a maximum area among at least one candidate region as a candidate region.

8. The electronic device of claim 7, wherein the processor is further configured to, based on an area of the candidate region being greater than a reference area, set the candidate region as the second region of interest.

9. The electronic device of claim 7, wherein the processor is further configured to capture the image based on the first focal distance based on an area of the candidate region being less than or equal to a reference area.

10. The electronic device of claim 1, wherein the first portion comprises a first object and the second portion comprises a second object, and
wherein the processor is further configured to, based on the first object extending to an outside of the first region of interest in the first image and an extended portion of the first object being located outside the first region of interest and having a size that is greater than or equal to a specified size, specify the second region of interest in at least a portion of the extended portion.

11. The electronic device of claim 1, wherein the distance extraction device comprises at least one of a time of flight (ToF) camera, an infrared camera, or a stereo camera.

12. An electronic device comprising:
a camera device configured to adjust a focus;
a distance extraction device; and
a processor configured to:
obtain a first image using the camera device;
set a first region of interest for focus detection in a portion of the first image;
obtain first depth information including a depth distance corresponding to each pixel among a plurality of pixels included in the first image using the distance extraction device;
based on an edge component in the first region of interest not being detected, set a first portion having a specified depth interval in the first region of interest;
set a second region of interest, having a depth distance in the specified depth interval and meeting a specified size, in another portion of the first image; and
capture an image based on focus determined corresponding to the second region of interest.

13. The electronic device of claim 12, wherein the processor is further configured to based on an edge level of the first region of interest being less than a first reference value, search for the second region of interest.

14. The electronic device of claim 12, wherein the processor is further configured to, based on a brightness level of the first region of interest being less than a second reference value, search for the second region of interest.

* * * * *